United States Patent
Popp et al.

(10) Patent No.: US 10,371,225 B2
(45) Date of Patent: Aug. 6, 2019

(54) SNUBBER FOR SHOVEL DIPPER

(71) Applicant: Harnischfeger Technologies, Inc., Wilmington, DE (US)

(72) Inventors: James R. Popp, Oak Creek, WI (US); Richard Nicoson, Hartford, WI (US); Dave Schob, Gilbert, AZ (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 135 days.

(21) Appl. No.: 15/445,599

(22) Filed: Feb. 28, 2017

(65) Prior Publication Data
US 2018/0087593 A1    Mar. 29, 2018

Related U.S. Application Data

(60) Provisional application No. 62/400,890, filed on Sep. 28, 2016.

(51) Int. Cl.
*F16F 9/14* (2006.01)
*E02F 3/30* (2006.01)
(Continued)

(52) U.S. Cl.
CPC ............. *F16F 9/145* (2013.01); *E02F 3/301* (2013.01); *E02F 3/342* (2013.01); *E02F 3/401* (2013.01); *E02F 3/4075* (2013.01)

(58) Field of Classification Search
CPC . E02F 3/40; E02F 3/4075; E02F 3/407; E02F 9/22; E02F 9/2207; E02F 9/2203;
(Continued)

(56) References Cited

U.S. PATENT DOCUMENTS 2,722,289 A  *  11/1955  Girard ...................... F16F 9/14
                                                    137/493.2
3,021,822 A  *   2/1962  Rumsey ................ F16J 15/545
                                                    277/345
(Continued)

FOREIGN PATENT DOCUMENTS

CA           2253258 C       8/2005

OTHER PUBLICATIONS

"Casting Benefits", A Design Study in Steel—Spokane Industries Steel Snubber Arm, (2010), pp. 9-33, Steel Founders' Society of America.
(Continued)

*Primary Examiner* — Jessica H Lutz
(74) *Attorney, Agent, or Firm* — Michael Best & Friedrich LLP (57) ABSTRACT

A damper for dampening rotation of a dipper door relative to a dipper body of a mining shovel includes a shaft, an arm, and a high pressure fluid seal. The shaft supported for rotation about a shaft axis, and rotation of the shaft is dampened by fluid in an enclosed chamber. The high pressure fluid seal engages an outer surface of the shaft at a position between the first end of the shaft and the second end of the shaft. The high pressure fluid seal engages an outer surface of the shaft and includes a low pressure side and a high pressure side adjacent a shaft cavity. The arm includes a first end coupled to the first end of the shaft, and a second end coupled to the dipper door or the dipper body such that rotation of the dipper door drives the arm to rotate the shaft.

21 Claims, 9 Drawing Sheets

(51) Int. Cl.
*E02F 3/342* (2006.01)
*E02F 3/407* (2006.01)
*E02F 3/40* (2006.01)

(58) Field of Classification Search
CPC .. E02F 9/2214; F16F 9/10; F16F 9/103; F16F 9/14; F16F 9/145; F16F 9/187
See application file for complete search history.

(56) References Cited

U.S. PATENT DOCUMENTS

| | | | |
|---|---|---|---|
| 4,674,608 A * | 6/1987 | Morris | B60G 15/06 |
| | | | 188/290 |
| 4,723,639 A * | 2/1988 | Hungerford | F16F 9/145 |
| | | | 188/307 |
| 4,926,984 A * | 5/1990 | Pollitt | F16F 9/145 |
| | | | 188/306 |
| 4,938,322 A * | 7/1990 | Sugasawara | F16F 9/103 |
| | | | 16/51 |
| 5,613,308 A | 3/1997 | Little | |
| 5,735,067 A * | 4/1998 | Isley | E02F 3/4075 |
| | | | 188/307 |
| 5,815,960 A | 10/1998 | Soczka | |
| 5,974,705 A | 11/1999 | Isley et al. | |
| 6,219,946 B1 | 4/2001 | Soczka | |
| 6,467,202 B1 | 10/2002 | Brown, Jr. | |
| 7,096,610 B1 | 8/2006 | Gilmore | |
| 8,276,386 B2 | 10/2012 | Ziminsky et al. | |
| 9,045,883 B2 | 6/2015 | Schob et al. | |
| 9,194,454 B2 * | 11/2015 | Okimura | B60N 2/20 |
| 2011/0239494 A1 | 10/2011 | Dube et al. | |
| 2012/0260538 A1* | 10/2012 | Schob | E02F 3/4075 |
| | | | 37/445 |
| 2012/0286563 A1 | 11/2012 | Lichterfeld et al. | |

OTHER PUBLICATIONS

"Snubber Arm for the Dipper Door Control on Mining Shovels", A Design Study in Steel Castings, (2010), pp. 1-33, Steel Founders' Society of America.

"A Breakthrough Approach to Superior Dipper Performance", Optima Dipper Systems P&H catalog, (2009), pp. 1-6, P&H MinePro Services.

"SnubRite Dipper Snubbers", The Solution Files: A Guide to P&H Mining Equipment, (2011), 2 pages, P&H MinePro Services.

* cited by examiner

SNUBBER FOR SHOVEL DIPPER

CROSS-REFERENCE TO RELATED APPLICATION

This application claims the benefit of prior-filed, U.S. Provisional Patent Application No. 62/400,890, filed Sep. 28, 2016, the entire contents of which are incorporated by reference.

BACKGROUND

The present disclosure relates to mining shovels, and particularly to a snubber for a shovel dipper.

Rope shovels generally utilize a dipper for digging into a bank of material. The dipper has a dipper door on the bottom surface of the dipper that is rotatably connected by a door pin. After filling the dipper, the operator positions the dipper over a loading vehicle and triggers a latch mechanism to release the dipper door. Under the weight of the material in the dipper, the door swings down and away from the dipper body about the door pin. After the material has been unloaded, the operator may then move the dipper into a tucked position to close the door against the dipper body. One or more hydraulic snubbers may be coupled between the dipper door and dipper body to dampen rotation of the door.

SUMMARY

In one aspect, a damper for dampening rotation of a dipper door relative to a dipper body of a mining shovel includes a housing defining an enclosed chamber, a shaft, a shaft cavity, a high pressure fluid seal, and an arm. The shaft includes a first end and a second end, and the second end is positioned in the enclosed chamber. The shaft is supported for rotation relative to the housing about a shaft axis, and rotation of the shaft is dampened by fluid in the enclosed chamber. The shaft cavity is positioned between an outer surface of a portion of the shaft and the housing. The high pressure fluid seal engages an outer surface of the shaft at a position between the first end of the shaft and the second end of the shaft. The high pressure fluid seal engages an outer surface of the shaft and includes a low pressure side and a high pressure side adjacent the shaft cavity. The arm includes a first end and a second end, and the first end of the arm is coupled to the first end of the shaft. The second end of the arm is configured to be coupled to one of the dipper door and the dipper body such that rotation of the dipper door drives the arm to rotate the shaft.

In another aspect, a dipper assembly for a mining shovel including a body, a door, and a snubber for dampening movement of the door relative to the body. The body defines a material receiving opening and a material discharging opening. The door is pivotably coupled to the body to selectively close the material discharging opening. The snubber includes a housing, a shaft, a shaft cavity, a high pressure fluid seal, and an arm. The housing is coupled to one of the body and the door and the housing defines an enclosed chamber. The shaft includes a first end and a second end. The second end is positioned in the enclosed chamber. The shaft is supported for rotation relative to the housing about a shaft axis, and rotation of the shaft is dampened by fluid in the enclosed chamber. The shaft cavity is positioned between an outer surface of a portion of the shaft and the housing. The high pressure fluid seal engages an outer surface of the shaft at a position between the first end of the shaft and the second end of the shaft. The high pressure fluid seal includes a low pressure side and a high pressure side adjacent the shaft cavity. The arm includes a first end and a second end. The first end of the arm is coupled to the first end of the shaft, and the second end of the arm is pivotably coupled to the other of the body and the door. Movement of the door relative to the body drives the arm to pivot and rotate the shaft about the shaft axis.

In yet another embodiment, a damper for dampening rotation of a dipper door relative to a dipper body of a mining shovel includes a housing defining an enclosed chamber, a shaft, a shaft cavity, an arm, and a seal member. The shaft includes a first end and a second end. The second end is positioned in the enclosed chamber. The shaft is supported for rotation relative to the housing about a shaft axis, and rotation of the shaft is dampened by fluid in the enclosed chamber. The shaft cavity is positioned between an outer surface of a portion of the shaft and the housing. The arm includes a first end and a second end. The first end of the arm is coupled to the first end of the shaft, and the second end of the arm is configured to be coupled to one of the dipper door and the dipper body such that rotation of the dipper door drives the arm to rotate the shaft. The seal member is positioned between a side surface of the housing and the first end of the arm. The seal member supports a dust seal, a high pressure fluid seal, and a vacuum seal. The dust seal prevents ingress of contaminants into the shaft cavity. The high pressure fluid seal engages an outer surface of the shaft and prevents fluid flow from the shaft cavity along an outer surface of the shaft. The high pressure fluid seal is positioned between the dust seal and the shaft cavity. The vacuum seal is positioned between the dust seal and the high pressure fluid seal.

Other independent aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Furthermore, and as described in subsequent paragraphs, the specific configurations illustrated in the drawings are intended to exemplify embodiments of the invention and that other alternative configurations are possible.

DETAILED DESCRIPTION

Figure 1:
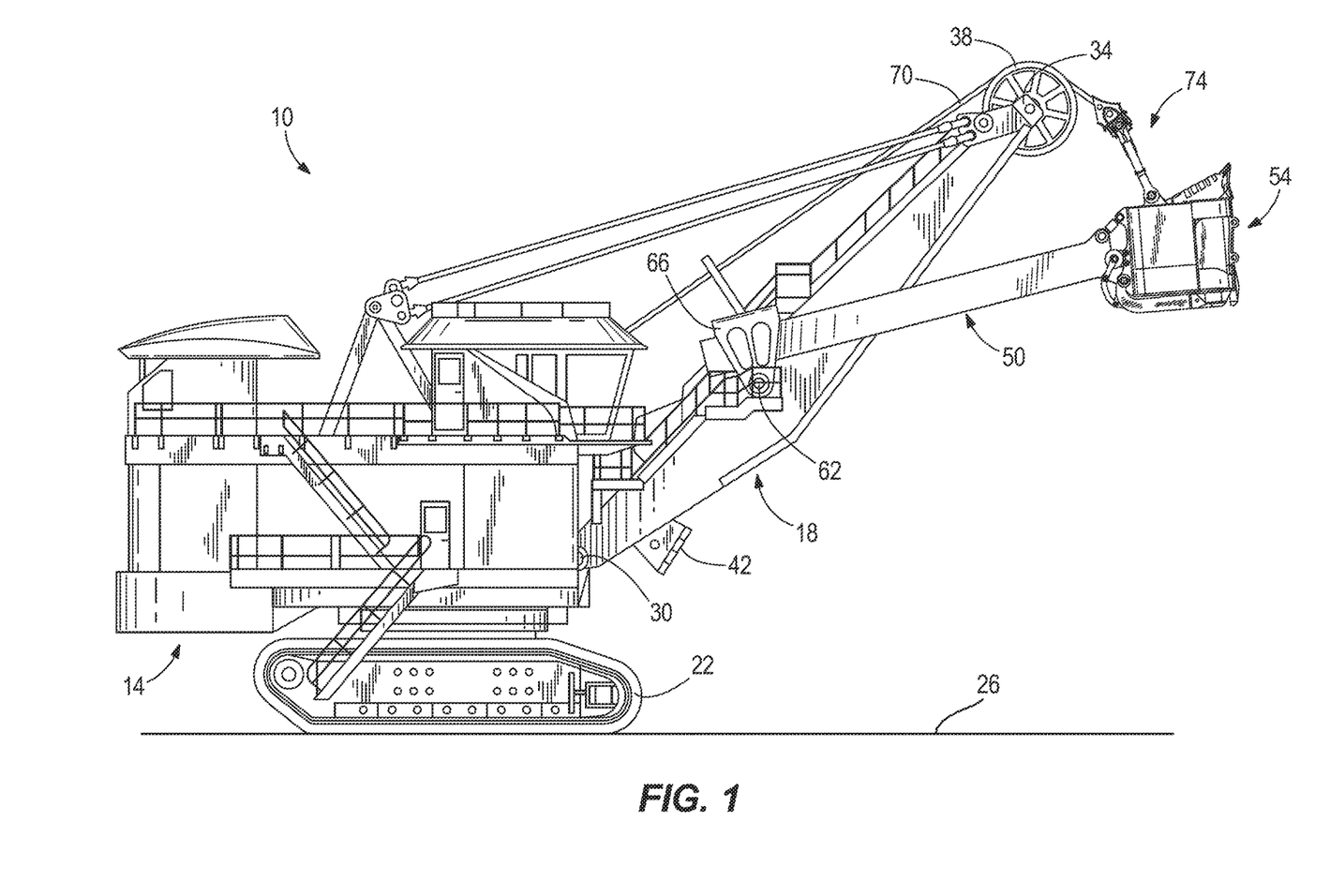
FIG. 1 is a side view of a mining shovel.

FIG. 1 illustrates a mining shovel 10 including a base 14 and a boom 18. The base 14 is supported by a traction mechanism (e.g., crawler tracks 22) for movement over the ground 26. The boom 18 includes a first or lower end 30 and a second or upper end 34, and the lower end 30 is coupled to the base 14. The upper end 34 includes a boom sheave 38. In the illustrated embodiment, the boom 18 also includes a bumper 42 positioned proximate the lower end 30.

The shovel 10 further includes a digging assembly including an elongated member or handle 50 and a dipper 54 coupled to one end of the handle 50. The handle 50 is supported for translational movement and rotational movement relative to the boom 18. In the illustrated embodiment, a shipper shaft 62 extends transversely through the boom 18 and includes a pinion (not shown). A lower surface of the handle 50 includes a rack (not shown) for engaging the pinion, and rotation of the pinion moves the handle 50 relative to the boom 18. Saddle blocks 66 are coupled to the shipper shaft 62 and receive an end of the handle 50 to maintain engagement between the rack and pinion.

In the illustrated embodiment, the shovel 10 also includes a hoist rope 70 extending over the boom sheave 38. One end of the hoist rope 70 is coupled to a bail assembly 74 that is coupled to the dipper 54, such that the hoist rope 70 supports the dipper 54. A portion of the hoist rope 70 is wrapped onto a hoist drum (not shown) supported on the base 14. Rotation of the hoist drum reels in and pays out the hoist rope 70, which respectively raises and lowers the dipper 54.

Figure 2:
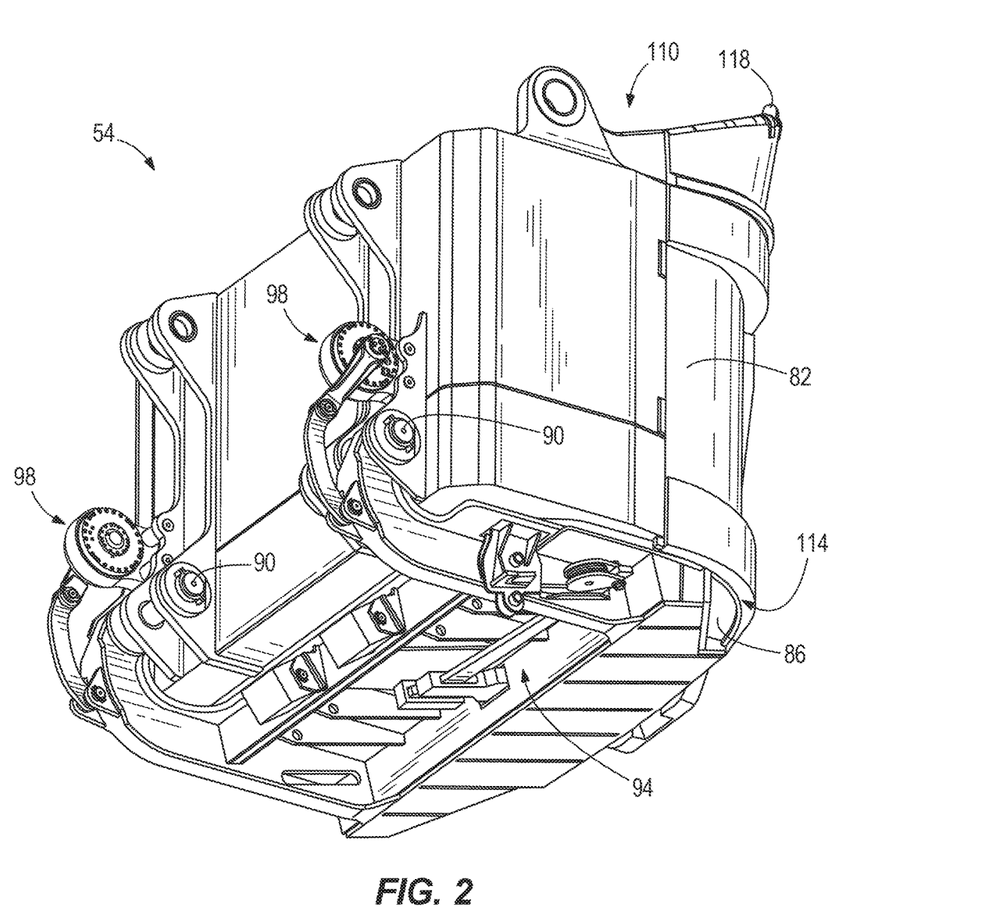
FIG. 2 is a perspective view of a dipper.
Figure 3:
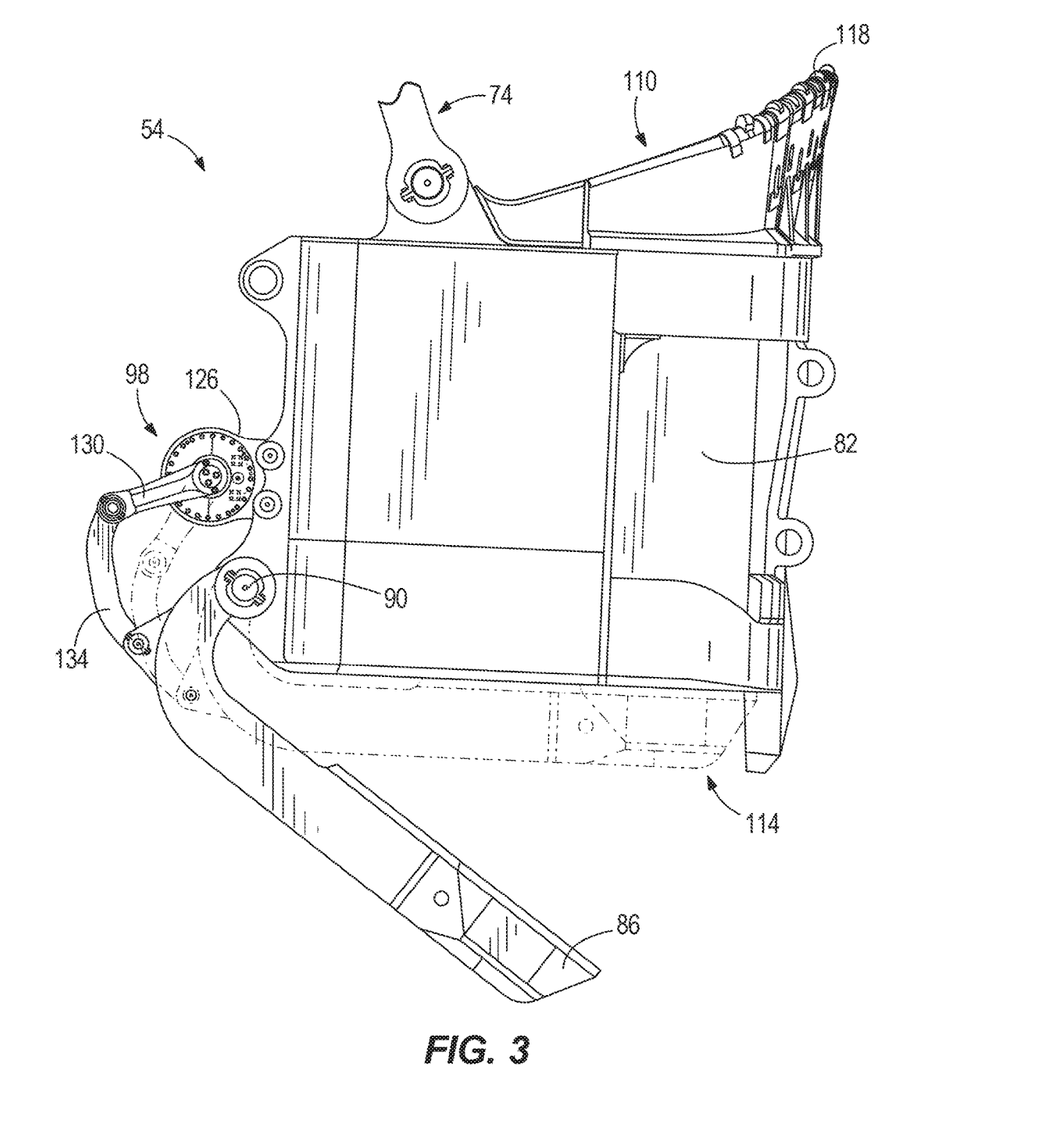
FIG. 3 is a side view of the dipper of FIG. 2 with the dipper door in an open position.

As shown in FIGS. 2 and 3, the dipper 54 includes a dipper body 82, a dipper door 86 pivotably coupled to the dipper body 82 (e.g., by door pins 90), a latch mechanism 94 (FIG. 2), and a pair of snubbers 98. The dipper body 82 includes a first end 110 defining a material receiving opening, and a second end 114 defining a material discharging opening. A digging edge 118 is positioned proximate the first end 110 and extends around a portion of the material receiving opening. The latch mechanism 94 releasably secures the dipper door 86 against the second end 114 of the dipper body 82 to selectively close the material discharging opening. When the latch mechanism 94 is released, the weight of the dipper door 86 and any material contained in the dipper body 82 causes the dipper door 86 to pivot about the door pins 90 (see FIG. 3) and away from the dipper body 82. The material then falls out from the dipper body 82 due to gravity.

Figure 4:
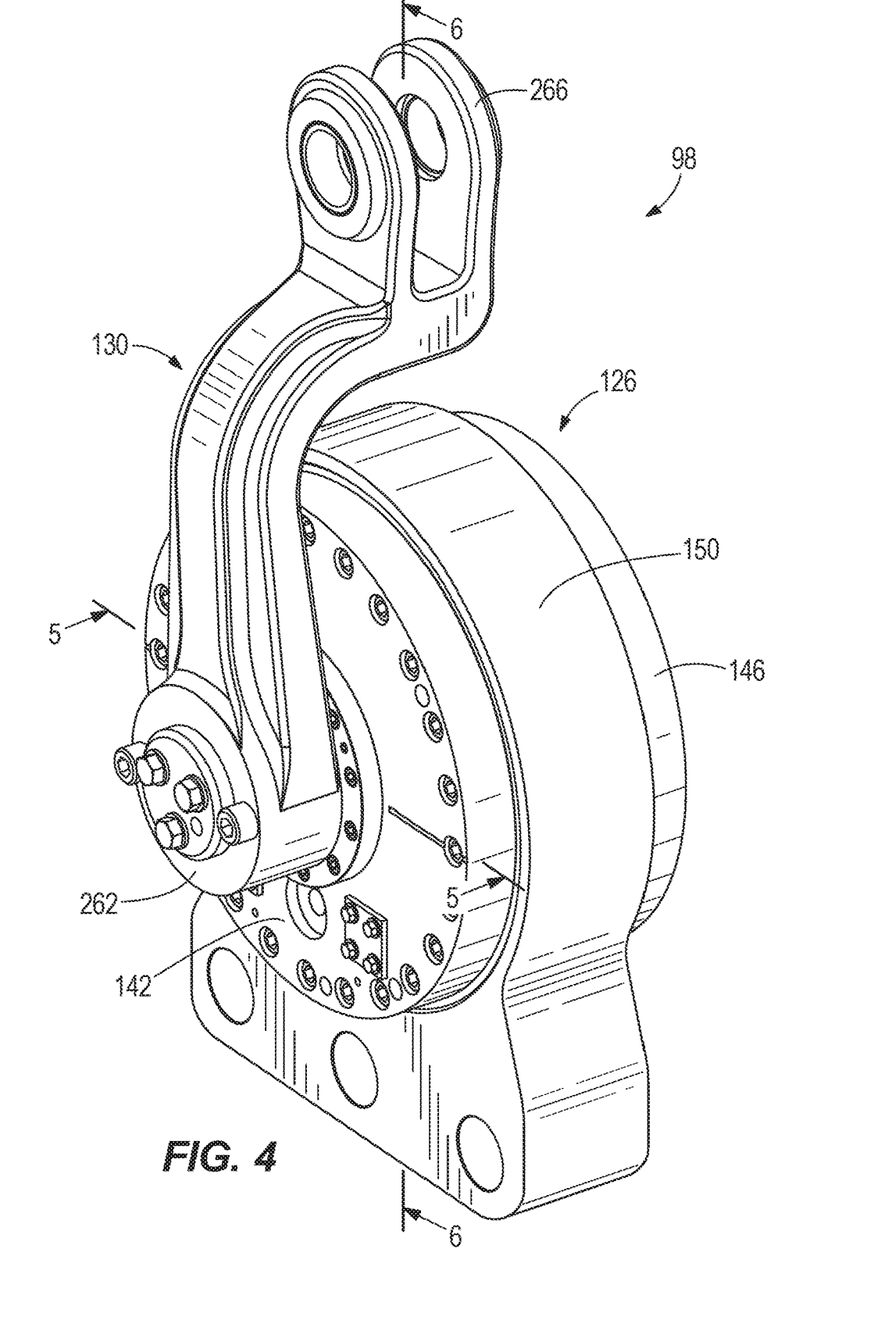
FIG. 4 is a perspective view of a snubber.

As shown in FIGS. 3 and 4, each snubber 98 includes a housing 126 and a snubber arm 130. As the dipper door 86 opens (FIG. 3), the door 86 rotates about the door pins 90 and rotates the snubber arm 130 with respect to the housing 126 (e.g., clockwise in FIG. 3). In the illustrated embodiment, the housing 126 is secured to a rear wall of the dipper body 82 proximate the door pins 90, and the snubber arm 130 is coupled to the dipper door 86. In other embodiments, the housing 126 may be secured to the dipper door 86 and the snubber arm 130 may be coupled to the dipper body 82. Also, in some embodiments, a link 134 (FIG. 3) is coupled between the snubber arm 130 and the dipper door 86; in other embodiments, the snubber arm 130 may be directly coupled to the dipper door 86.

Referring to FIG. 4, the housing 126 includes a first wall or cover 142, a second wall or cover 146, and a main body 150 having a first side and a second side. The first cover 142 is coupled to the first side, and the second cover 146 is coupled to the second side.

Figure 5:
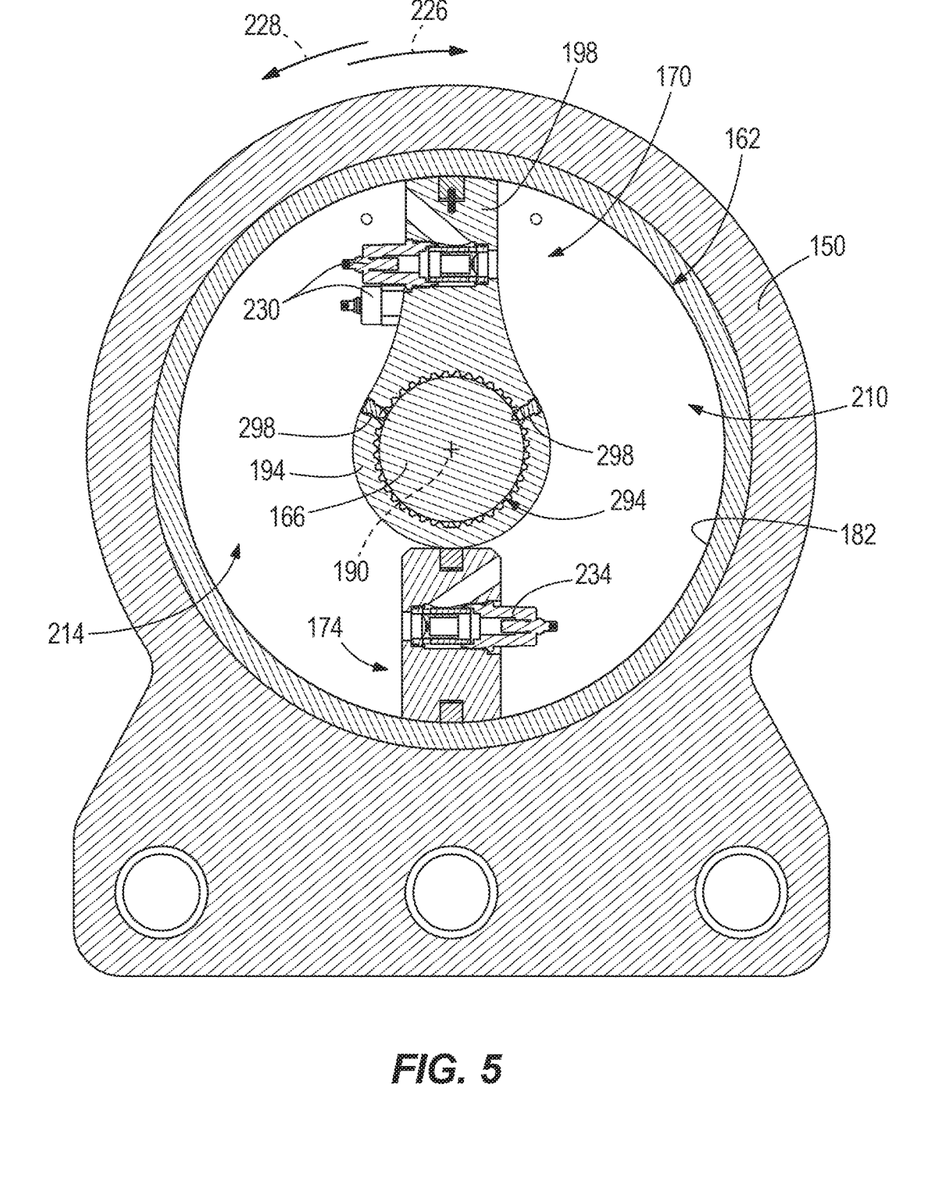
FIG. 5 is a cross-section view of the snubber of FIG. 4, viewed along section 5-5.

As shown in FIG. 5, the main body 150 includes an enclosed or interior chamber 162, a paddle 170, and a dam 174. The chamber 162 is defined by a wall 182 extending between the first side and the second side of the main body 150, and the ends of the chamber 162 are defined by the first cover 142 (FIG. 4) and the second cover 146. In the illustrated embodiment, the wall 182 has a cylindrical shape. The chamber 162 is filled with fluid (e.g., hydraulic fluid).

The snubber 98 further includes a shaft 166 extending through the chamber 162 and being rotatable about a shaft axis 190. As used herein, the term "radial" and variants thereof refers to a direction that is perpendicular to the shaft axis 190, and the term "axial" and variants thereof refers to a direction that is parallel to the shaft axis 190. The paddle 170 is coupled to the shaft 166 (e.g., by a spline portion 194) and rotates with the shaft 166 about the shaft axis 190. The paddle 170 includes an arm 198 extending radially outwardly from the shaft axis 190 and an end of the arm 198 sealingly engages the wall 182. The dam 174 is positioned in the chamber 162 and extends radially from the shaft axis 190. A radially inner end of the dam 174 engages the paddle 170, and a radially outer end of the dam 174 sealingly engages the wall 182.

The paddle 170 and dam 174 substantially partition the chamber 162 into a first portion 210 and a second portion 214, such that a first side of the paddle 170 and a first side of the dam 174 are positioned adjacent the first portion 210 while a second side of the paddle 170 and a second side of the dam 174 are positioned adjacent the second portion 214. When the paddle 170 is rotated in a first direction 226 about the shaft axis 190, a pressure of the fluid in the first portion 210 increases, and a pressure of the fluid in the second portion 214 decreases. Similarly, when the paddle 170 is rotated in a second direction 228 about the shaft axis 190, a pressure of the fluid in the second portion 214 increases, and a pressure of the fluid in the first portion 210 decreases.

The paddle 170 includes paddle valves 230 to allow fluid to pass from a portion having higher pressure to a portion having lower pressure. Similarly, the dam 174 includes dam valves 234 to allow fluid to pass from a portion having higher pressure to a portion having lower pressure. In some embodiments, the paddle valves 230 permit fluid to flow in one direction only (e.g., from the first portion 210 to the second portion 214), and the dam valves 234 permit fluid to flow in the opposite direction only (e.g., from the second portion 214 to the first portion 210). In other embodiments, some of the paddle valves 230 and some of the dam valves 234 permit fluid flow in one direction, while other paddle valves 230 and other dam valves 234 permit fluid flow in the opposite direction. In still other embodiments, both the paddle valves 230 and the dam valves 234 are bi-directional, permitting fluid flow in both directions.

Figure 6:
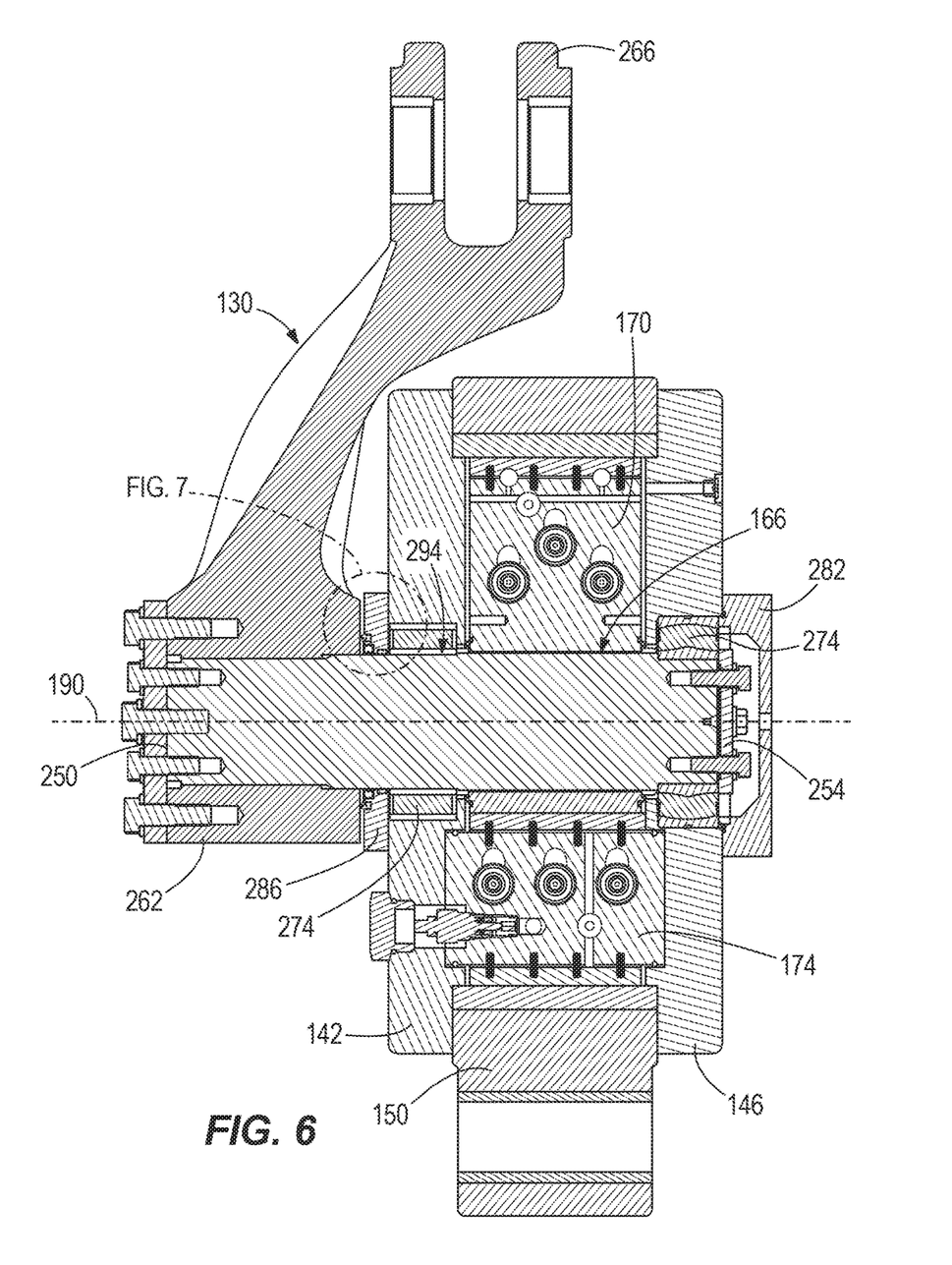
FIG. 6 is a cross-section view of the snubber of FIG. 4, viewed along section 6-6.

Referring now to FIG. 6, the shaft 166 includes a first end 250 and a second end 254. The shaft 166 extends through the main body 150 and through the first cover 142 such that the first end 250 is positioned outside of the housing 126. The first end 250 of the shaft 166 is coupled to a first end 262 of the snubber arm 130 (a second end 266 of the snubber arm 130 is coupled to the link 134—FIG. 3). The rotation of the dipper door 86 (FIG. 3) drives the rotation of the snubber arm 130 and the shaft 166 about the shaft axis 190. The shaft 166 is supported for rotation relative to the housing 126 by shaft bearings 274 (e.g., straight roller bearings, tapered roller bearings, spherical bearings, etc.).

In the illustrated embodiment, the second end 254 of the shaft 166 extends at least partially through the second cover 146 and is covered by a seal cover 282. In addition, a seal plate or retainer plate or carrier plate 286 is positioned adjacent the first cover 142 and extends around the shaft 166 proximate the first end 250. The carrier plate 286 sealingly engages the shaft 166 (discussed in further detail below). A shaft cavity 294 is defined by space between the seal cover 282 and the carrier plate 286, space radially between the shaft 166 and each of the housing 126 and the paddle 170. In the illustrated embodiment, the bearings 274 are positioned in the shaft cavity 294.

The shaft cavity 294 is generally isolated from the chamber 162, although the housing 126 may include check valves 298 (FIG. 5) configured to expose the shaft cavity 294 to the low pressure portion of the chamber 162 during each cycle. The check valves 298 ensure that a pressure in the shaft cavity 294 does not build to an appreciable level (for example, the check valves 298 may maintain the pressure less than 20 psi). In some embodiments, the pressure in the shaft cavity 294 is maintained at a negative pressure (vacuum) during operation.

Figure 7:
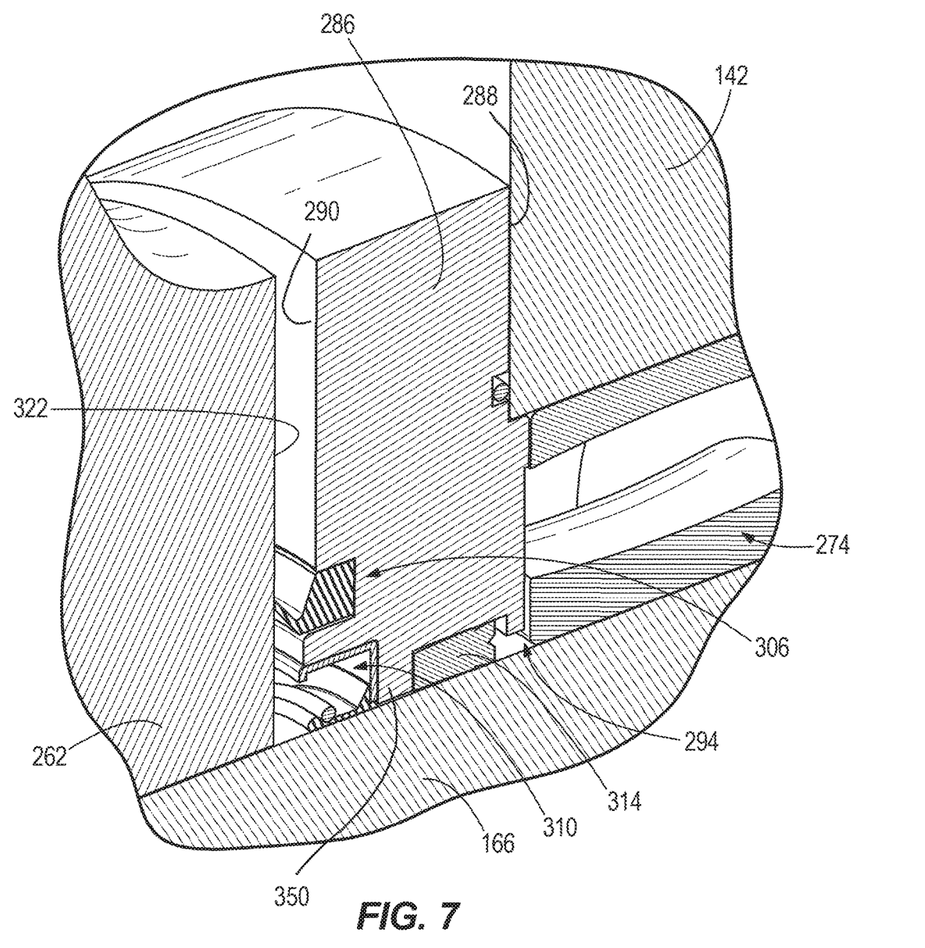
FIG. 7 is an enlarged view of a portion of the cross-section of FIG. 6.

As shown in FIG. 7, the carrier plate 286 includes a first surface or inner end surface 288 abutting the housing 126 and a second surface or outer end surface 290 opposite the inner end surface 288. In the illustrated embodiment, the inner end surface of the carrier plate 286 is secured against a surface of the first cover 142 (e.g., by fasteners), and the carrier plate 286 is positioned between the housing 126 and the arm 130.

Figure 8:
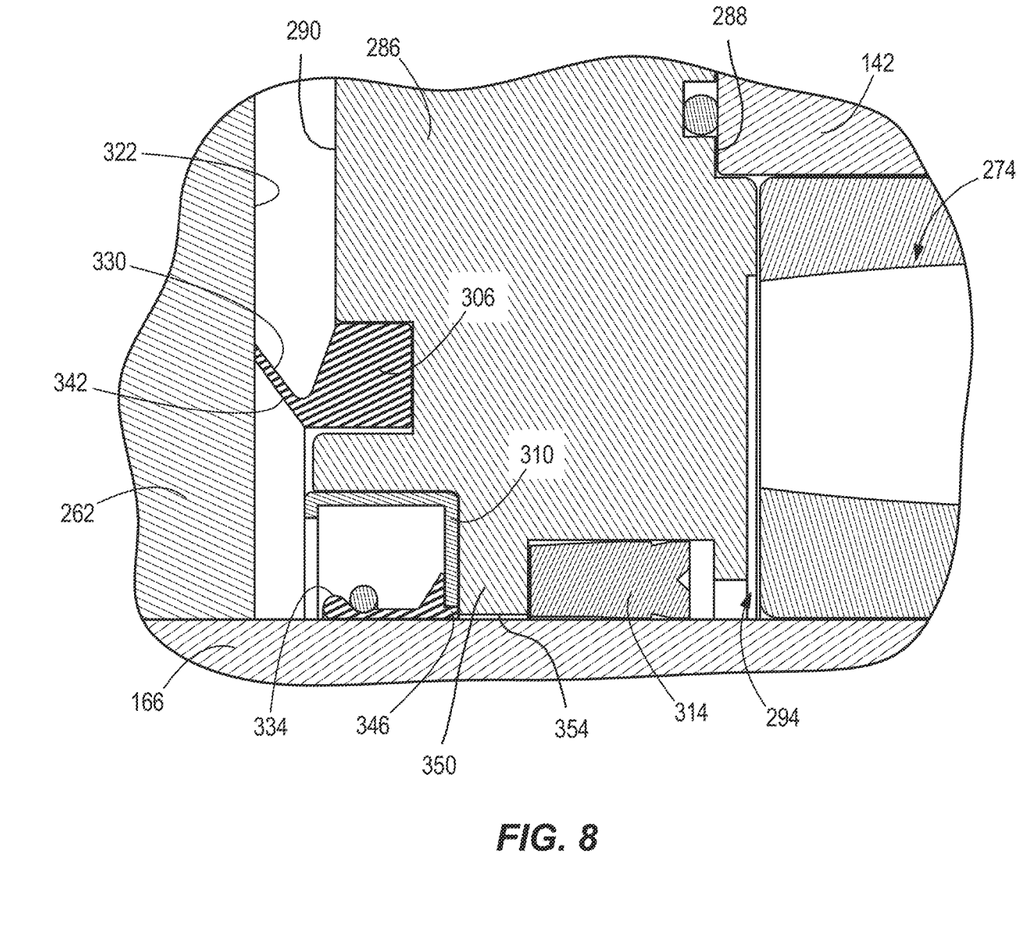
FIG. 8 is an enlarged view of the portion of the snubber of FIG. 7.
Figure 9:
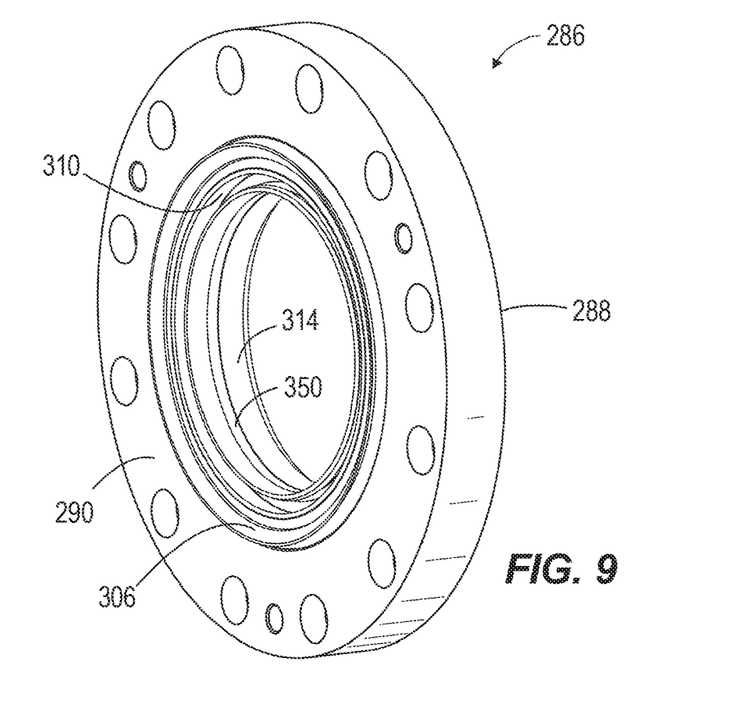
FIG. 9 is a perspective view of a carrier plate.
Figure 10:
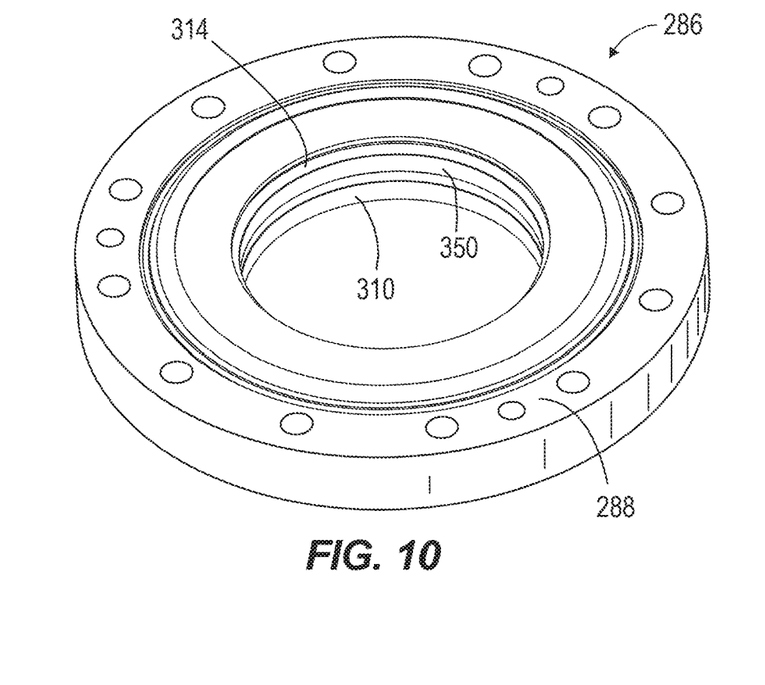
FIG. 10 is another perspective view of the carrier plate of FIG. 9.

Referring now to FIGS. 7-10, the carrier plate 286 supports a dust seal 306, a vacuum seal 310, and a high pressure seal 314. As shown in FIGS. 7 and 8, the dust seal 306 is positioned on the outer end surface 290 of the carrier plate 286 and engages a surface 322 of the snubber arm 130. The vacuum seal 310 is positioned on an inner radial surface of the carrier plate 286 (i.e., a surface that extends between the inner end surface 288 and the outer end surface 290 and positioned adjacent the shaft 166). The vacuum seal 310 engages an outer surface of the shaft 166.

Referring to FIG. 8, the dust seal 306 is oriented such that a high pressure (i.e., upstream) side 330 faces away from the shaft cavity 294, and the vacuum seal 310 is oriented such that a high pressure side 334 faces away from the shaft cavity 294. The dust seal 306 and the vacuum seal 310 prevent ingress of dirt or contaminants into the cavity 294 from the ambient environment. The dust seal 306 also includes a low pressure (i.e., downstream) side 342 and the vacuum seal 310 includes a low pressure side 346, both of which are oriented toward the shaft cavity 294.

The high pressure seal 314 is also positioned on the inner radial surface of the carrier plate 286 and engages the outer surface of the shaft 166. The high pressure seal 314 is axially spaced apart from the dust seal 306 and the vacuum seal 310 proximate the inner end surface 290 of the carrier plate 286 that is adjacent the shaft cavity 294. Stated another way, the high pressure seal 314 is positioned upstream from the dust seal 306 and the vacuum seal 310, between the shaft cavity 294 and the vacuum seal 310. The high pressure seal 314 is oriented such that a high pressure side of the seal 314 faces toward the shaft cavity 294 (i.e., upstream), preventing fluid from leaking from the cavity 294. In addition, the carrier plate 286 includes a radial shoulder 350 positioned adjacent a low pressure or downstream side of the high pressure seal 314 (i.e., axially between the high pressure seal 314 and the vacuum seal 310). The radial shoulder 350 supports the high pressure seal 314, providing a backstop. In the illustrated embodiment, an inner radial surface 354 of the radial shoulder 350 is spaced apart from the outer surface of the shaft 166 by a narrow clearance.

During normal operation of the dipper 54, the shaft cavity 294 is maintained at a very low relative pressure (e.g., vacuum pressure). However, certain abnormal conditions arising from operator misuse (e.g., a track strike) and/or abrupt, cold starts may result in a large pressure build-up within the shaft cavity 294. The pressure spikes would cause a low pressure seal to fail catastrophically.

For many years, shovel operators have reported snubber problems related to shaft seal failure, but snubber manufacturers and service companies were unable to identify a root cause for these failures. The pressure spike in the shaft cavity would have been extremely difficult to detect at least because it is difficult to sense the pressure in the cavity during operation and the conditions causing the pressure spike are sporadic. Furthermore, the occurrence of very large pressures (e.g., between approximately 1,000 psig to approximately 2,000 psig) in the shaft cavity of a snubber would not have been apparent or intuitive to service personnel or manufacturers because the cavity is maintained at a very low pressure. This reasoning has led others to investigate other potential sources of failed shaft seals, without resulting in a solution that addresses the root cause.

Unlike conventional snubbers, the carrier plate 286 includes a dynamic high pressure seal 314 to account for large pressures in the shaft cavity 294. In some embodiments, the high pressure seal 314 can accommodate pressures of at least 100 psig. In some embodiments, the high pressure seal 314 can accommodate pressures of at least 1,000 psig. In some embodiments, the high pressure seal 314 can accommodate pressures of at least 2,000 psig.

Although various aspects have been described in detail with reference to certain embodiments, variations and modifications exist within the scope and spirit of one or more independent aspects as described.

We claim:

1. A damper for dampening rotation of a dipper door relative to a dipper body of a mining shovel, the damper comprising:
   a housing defining an enclosed chamber;
   a shaft including a first end and a second end, the shaft supported for rotation relative to the housing about a shaft axis, rotation of the shaft dampened by fluid in the enclosed chamber;
   a shaft cavity positioned between an outer surface of a portion of the shaft and the housing;
   a high pressure fluid seal engaging an outer surface of the shaft at a position between the first end of the shaft and the second end of the shaft, the high pressure fluid seal including a low pressure side and a high pressure side adjacent the shaft cavity; and
   an arm including a first end and a second end, the first end of the arm coupled to the first end of the shaft, the second end of the arm configured to be coupled to one of the dipper door and the dipper body such that rotation of the dipper door drives the arm to rotate the shaft.

2. The damper of claim 1, further comprising,
a paddle coupled to the shaft and secured for rotation with the shaft, the paddle at least partially dividing the enclosed chamber into a high pressure portion and a low pressure portion; and
a check valve for selectively providing fluid communication between the shaft cavity and the low pressure portion of the enclosed chamber.

3. The damper of claim 1, further comprising a carrier plate coupled to a side surface of the housing and including a first surface, a second surface, and a radial surface extending between the first surface and the second surface, the high pressure fluid seal secured to the radial surface thereby sealing the shaft cavity.

4. The damper of claim 1, further comprising at least one roller bearing positioned in the shaft cavity and supporting the shaft for rotation relative to the housing.

5. The damper of claim 1, wherein the high pressure fluid seal can withstand a pressure differential of at least approximately 1,000 psi exerted on the high pressure side.

6. The damper of claim 1, further comprising at least one auxiliary seal including an upstream side and a downstream side, the downstream side of the auxiliary seal oriented toward the shaft cavity,
wherein the high pressure fluid seal is positioned along a fluid path between the shaft cavity and the auxiliary seal.

7. The damper of claim 6, wherein the at least one auxiliary seal including a dust seal and a vacuum seal, the vacuum seal positioned along a flow path between the high pressure fluid seal and the dust seal.

8. The damper of claim 6, wherein the at least one auxiliary seal includes a dust seal engaging a surface of the arm to prevent ingress of contaminants into the shaft cavity.

9. The damper of claim 6, further comprising a carrier plate coupled to a side surface of the housing and including a first surface, a second surface opposite the first surface, and a radial surface extending between the first surface and the second surface, wherein the high pressure fluid seal and the at least one auxiliary seal are secured to the carrier plate.

10. A dipper assembly for a mining shovel, the dipper assembly comprising:
a body defining a material receiving opening and a material discharging opening;
a door pivotably coupled to the body to selectively close the material discharging opening; and
a snubber for dampening movement of the door relative to the body, the snubber including,
a housing coupled to one of the body and the door, the housing defining an enclosed chamber,
a shaft including a first end and a second end, the shaft supported for rotation relative to the housing about a shaft axis, rotation of the shaft dampened by fluid in the enclosed chamber,
a shaft cavity positioned between an outer surface of a portion of the shaft and the housing,
a high pressure fluid seal engaging an outer surface of the shaft at a position between the first end of the shaft and the second end of the shaft, the fluid seal including a low pressure side and a high pressure side adjacent the shaft cavity, and
an arm including a first end and a second end, the first end of the arm coupled to the first end of the shaft, the second end of the arm pivotably coupled to the other of the body and the door, movement of the door relative to the body driving the arm to pivot and rotate the shaft about the shaft axis.

11. The dipper assembly of claim 10, further comprising,
a paddle coupled to the shaft and secured for rotation with the shaft, the paddle at least partially dividing the enclosed chamber into a high pressure portion and a low pressure portion; and
a check valve for selectively providing fluid communication between the shaft cavity and the low pressure portion of the enclosed chamber.

12. The dipper assembly of claim 10, further comprising a carrier plate coupled to a side surface of the housing and including a first surface, a second surface, and a radial surface extending between the first surface and the second surface, the first surface partially enclosing the shaft cavity, the high pressure fluid seal secured to the radial surface thereby sealing the shaft cavity.

13. The dipper assembly of claim 10, further comprising at least one roller bearing positioned in the shaft cavity and supporting the shaft for rotation relative to the housing.

14. The dipper assembly of claim 10, wherein the high pressure fluid seal can withstand a pressure differential of at least 1,000 psi exerted on the high pressure side.

15. The dipper assembly of claim 10, further comprising at least one auxiliary seal including an upstream side and a downstream side, the downstream side of the auxiliary seal oriented toward the shaft cavity,
wherein the high pressure fluid seal is positioned along a fluid path between the shaft cavity and the auxiliary seal.

16. The dipper assembly of claim 15, wherein the at least one auxiliary seal including a dust seal and a vacuum seal, the vacuum seal positioned along a flow path between the high pressure fluid seal and the dust seal.

17. The dipper assembly of claim 15, wherein the at least one auxiliary seal includes a dust seal engaging a surface of the arm to prevent ingress of contaminants into the shaft cavity.

18. A damper for dampening rotation of a dipper door relative to a dipper body of a mining shovel, the damper comprising:
a housing defining an enclosed chamber;
a shaft including a first end and a second end, the shaft supported for rotation relative to the housing about a shaft axis, rotation of the shaft dampened by fluid in the enclosed chamber;
a shaft cavity positioned between an outer surface of a portion of the shaft and the housing;
an arm including a first end and a second end, the first end of the arm coupled to the first end of the shaft, the second end of the arm configured to be coupled to one of the dipper door and the dipper body such that rotation of the dipper door drives the arm to rotate the shaft; and
a seal member positioned between a side surface of the housing and the first end of the arm, the seal member supporting a dust seal, a high pressure fluid seal, and a vacuum seal, the dust seal preventing ingress of contaminants into the shaft cavity, the high pressure fluid seal engaging an outer surface of the shaft and preventing fluid flow from the shaft cavity along an outer surface of the shaft, the high pressure fluid seal positioned between the dust seal and the shaft cavity, the vacuum seal positioned between the dust seal and the high pressure fluid seal.

19. The damper of claim 18, wherein the seal member includes an inner surface adjacent the housing, an outer surface adjacent the arm, and a radial surface extending between the inner surface and the outer surface, the inner surface partially enclosing the shaft cavity, wherein the high pressure seal is supported on the radial surface.

20. The damper of claim 18, further comprising,
a paddle coupled to the shaft and secured for rotation with the shaft, the paddle at least partially dividing the enclosed chamber into a high pressure portion and a low pressure portion; and
a check valve for selectively providing fluid communication between the shaft cavity and the low pressure portion of the enclosed chamber.

21. The damper of claim 18, wherein the high pressure fluid seal can withstand a pressure differential of at least approximately 1,000 psi exerted on the high pressure side.

* * * * *